(12) United States Patent
Newton

(10) Patent No.: US 9,391,847 B2
(45) Date of Patent: Jul. 12, 2016

(54) CONTENT DELIVERY METHODS AND SYSTEMS

(71) Applicant: Level 3 Communications, LLC, Broomfield, CO (US)

(72) Inventor: Christopher Newton, Westlake Village, CA (US)

(73) Assignee: Level 3 Communications, LLC, Broomfield ( * ) Notice: Subject to any disclaimer, the term of this patent is extended or adjusted under 35 U.S.C. 154(b) by 119 days.

(21) Appl. No.: 14/454,615

(22) Filed: Aug. 7, 2014

(65) Prior Publication Data

US 2015/0046575 A1     Feb. 12, 2015

Related U.S. Application Data

(60) Provisional application No. 61/863,716, filed on Aug. 8, 2013.

(51) Int. Cl.
| | |
|---|---|
| *H04L 29/08* | (2006.01) |
| *H04L 12/24* | (2006.01) |
| *G06F 17/24* | (2006.01) |
| *H04L 12/741* | (2013.01) |
| *H04L 12/911* | (2013.01) |

(Continued)

(52) U.S. Cl.
CPC ............ *H04L 41/50* (2013.01); *G06F 17/248* (2013.01); *G06Q 20/123* (2013.01); *H04L 45/74* (2013.01); *H04L 47/82* (2013.01); *H04L 61/1511* (2013.01); *H04L 67/06* (2013.01); *H04L 61/305* (2013.01)

(58) Field of Classification Search
CPC ................................ H04L 41/50; H04L 45/00

USPC .................. 709/219, 223, 224, 238, 244
See application file for complete search history.

(56) References Cited

U.S. PATENT DOCUMENTS

| | | | | |
|---|---|---|---|---|
| 7,117,504 | B2 * | 10/2006 | Smith | ............... G06F 8/20 709/201 |
| 7,149,797 | B1 * | 12/2006 | Weller | ............... G06Q 40/04 370/254 |
| 2002/0006116 | A1 * | 1/2002 | Burkhart | ............... H04B 7/18584 370/316 |

(Continued)

OTHER PUBLICATIONS

"DNS Traffic Management using the BIG-IP Local Traffic Manager"—F5 Oct. 2012 https://www.f5.com/pdf/deployment-guides/dns-load-balancing-dg.pdf.*

(Continued)

*Primary Examiner* — Randy Scott

(57) ABSTRACT

Aspects of the present disclosure involve provisioning customers of an aggregator, such as a reseller, of a content delivery network (CDN). In one aspect, content requests to the CDN are processed in accordance with the virtual IP (VIP) address at which the request was received, according to a property template bound to the VIP where the template is selected by the customer and only involves discrete parameters for the reseller. In another aspect, cache fills of the network are processed without direct knowledge of the customer origin through a combination of some request attribute, e.g., alias host of the customer, and an attribute of the reseller to make a DNS request to a name server outside the CDN. Another aspect involves receiving a property template selection, an origin and an alias from a customer of the reseller, and providing appropriate DNS entries to validate the customer and provide origin information to the CDN.

37 Claims, 8 Drawing Sheets

(51) Int. Cl.
*G06Q 20/12* (2012.01)
*H04L 29/12* (2006.01)

(56) References Cited

U.S. PATENT DOCUMENTS

2008/0281945 A1* 11/2008 Gill ................... H04L 12/1859
 709/219
2011/0276679 A1 11/2011 Newton et al.
2013/0159473 A1* 6/2013 Newton ............. H04L 67/2852
 709/219
2013/0174177 A1* 7/2013 Newton ............. H04L 67/1008
 718/105
2013/0191499 A1* 7/2013 Ludin ................. H04L 61/1511
 709/217
2014/0173135 A1* 6/2014 Varney ................ H04L 67/289
 709/245

OTHER PUBLICATIONS

International Search Report, dated Nov. 13, 2014, Int'l Appl. No. PCT/US14/050324, Int'l Filing Date Aug. 8, 2014; 3 pgs.
Written Opinion of the International Searching Authority, dated Nov. 13, 2014, Int'l Appl. No. PCT/US14/050324, Int'l Filing Date Aug. 8, 2014; 7 pgs.

* cited by examiner

CONTENT DELIVERY METHODS AND SYSTEMS

RELATED APPLICATIONS

This application claims priority under 35 U.S.C. §119 from U.S. provisional application No. 61/863,716 entitled "CONTENT DELIVERY METHODS AND SYSTEMS," filed on Aug. 8, 2013, the entire content of which is fully incorporated by reference herein for all purposes.

This application is also related to co-pending U.S. nonprovisional application Ser. No. 14/454,594 entitled "CONTENT DELIVERY METHODS AND SYSTEMS", filed Aug. 7, 2014, and co-pending U.S. nonprovisional application Ser. No. 14/454,608 entitled "CONTENT DELIVERY METHODS AND SYSTEMS", filed Aug. 7, 2014, the entire contents of which are fully incorporated by reference herein for all purposes.

TECHNICAL FIELD

Aspects of the present disclosure involve content delivery networks, and more particularly may involve systems and methods related to a content delivery networks employed in conjunction with a content delivery network reseller.

BACKGROUND

The Internet and the World Wide Web (the "Web") have become ubiquitous. Content providers (publishers) now use the Internet (and, particularly, the Web) to provide all sorts of content to numerous clients all over the world. In order to offload the job of serving some or all of their properties, many content providers now subscribe to content delivery networks (CDNs). Using a CDN, content can be served to clients from the CDN (i.e., from one or more servers in the CDN) instead of from the content provider's server(s). In a caching CDN, content may also be cached on some or all of the CDN servers, either before being served or in response to specific requests for that content. Having content cached within edge servers of the CDN enhances the performance of the CDN because the content does not have to be retrieved from origin servers or other locations, which are less efficient than edge servers in providing content.

Numerous forms of content, also referred to as resources, may be served from the CDN. For example, television shows and movies may now be accessed from any number of Web sites, and the shows and movies may actually be served from the CDN. Print newspapers have migrated to the Web and provide portals through which clients operating some form of computing device (e.g., PC, smart phone, or tablet), with a browser may access numerous forms of properties, such as short video clips, articles, images, and audio tracks. Software updates and patches, once only provided on disc and mailed to recipients, are now routinely distributed to devices using only network connections, and the updates and patches are often delivered from a CDN.

Traditionally, the CDN determines which property the request is for, and hence whether the request is for a legitimate subscriber (customer) of the CDN, by inspection of the incoming request. Generally speaking, each customer of a CDN will have at least one property configured on the CDN. The property specifies the hostname of the origin, the port number used by the origin, the protocol used by the origin, and other parameters. More specifically, determining legitimate requests thus involves inspection of the incoming Host: header and in certain specialized cases the first path element(s) (e.g., for the shared certificate secure sockets layer (SSL) service or the application name in the case of real-time messaging protocol (RTMP)). In such a situation, each Host: header (or top level path element, etc.) that may be presented to the CDN is pre-registered with the CDN as an alias for some property, and matching with the preconfigured property correlates with a legitimate request.

In some situations, a third party, such as a web site hosting company provides CDN reseller services to its customers. So, the third party does not actually operate a CDN but instead resells to its customers the CDN services of a separate CDN provider. In a high volume reseller model, this would mean that a very large and changing number of such aliases would be created and tracked by the CDN, and that the property creation and update rate of such would likely be equally high. Conventional CDNs are not particularly well equipped to deal with very large numbers of properties or with a high modification rate to the associated alias tables or property parameters.

It is with these observations in mind, among others, that various aspects of the present disclosure were conceived and developed.

SUMMARY

One implementation of the present disclosure may take the form of a method of managing content delivery in a computer network. The method may include the operations of receiving a content request for content of a customer of an aggregator of services, such as a reseller, of the content delivery network, the content request received at a virtual IP address of the content delivery network and processing the content request based on a property template associated with the virtual IP address and provided for selection by the customer. The method may further include the operations of identifying a host header from the content request and combining the host header with a fill template, where the combination identifies an origin of the customer for obtaining the content of the customer to fill the content request. In one embodiment, the combination of the host header with the template is a uniform resource locator to a CNAME established by the aggregator, the CNAME providing the origin and implicitly verifying the customer of the aggregator. Further, the content request received at the virtual IP address may be from resolving a first CNAME record based on the content request being initially associated with the alias and resolving a second CNAME record associating the first CNAME record with the CDN, the second CNAME record resolving to the virtual IP address based on a binding of the virtual IP address with the property template. The property template may be one of a discrete plurality of property configurations that include at least one of a delivery region, a cache control setting, a domain protocol, an origin protocol, a query string setting and a geo-blocking. In addition, the present disclosure may be embodied in a non-transitory computer readable media comprising computer executable instructions to perform a method and/or an apparatus.

Another implementation of the present disclosure may take the form of a method of managing content delivery in a computer network. The method may include the operations of receiving a content request for content of a customer of a aggregator of services, such as a reseller, of a content delivery network, identifying an attribute associated with a host header of the content request and combining the attribute with a fill template to identify an origin of the content, the identification of the origin of the content not directly maintained by the content delivery network. In one embodiment, the content request is received at a virtual IP address associated with a property template associated with an aggregator of services of the content delivery network and defining property parameters associated with processing the content request. The combination of the host header with the template provides a uniform resource locator to a CNAME established by the aggregator, the CNAME providing the origin and implicitly verifying the customer of the aggregator. Further, the method may include the operations of resolving a first CNAME record based on the content request being initially associated with the alias and resolving a second CNAME record associating the first CNAME record with the CDN, the second CNAME record resolving to the virtual IP address based on a binding of the virtual IP address with the property template. The property template may be one of a discrete plurality of property configurations that include at least one of a delivery region, a cache control setting, a domain protocol, an origin protocol, a query string setting and a geo-blocking. In addition, the present disclosure may be embodied in a non-transitory computer readable media comprising computer executable instructions to perform a method and/or an apparatus.

Yet another implementation of the present disclosure may take the form of a content delivery method. The method may include the operations of receiving a selection of one or more property parameters associated with a pre-established property template, the property template associated with processing a content request to a content delivery network, the selection being received from a customer of a aggregator of services of a content delivery network, receiving an origin and an alias of the origin, the origin for obtaining content of the customer of the aggregator of services, such as a reseller, of the content delivery network, the alias of the origin used by the customer of the aggregator for designating content to be served by the content delivery network, and establishing at least one first domain name system (DNS) record outside the authoritative name servers of the content delivery network, the at least one first DNS record creating an association between the alias of the origin and the origin such that a fill request from the content delivery network may be processed at the origin. In one embodiment, the DNS includes a combination of the alias and a domain of the aggregator is established in an authoritative name server of the aggregator. Further, the DNS record comprising the combination of the alias and the domain of the aggregator may be only established for a valid customer of the aggregator of services of the content delivery network. In one embodiment, the fill request from the content delivery network may be processed at the origin without the content delivery network having direct information as to the origin. In addition, the present disclosure may be embodied in a non-transitory computer readable media comprising computer executable instructions to perform a method and/or an apparatus.

BRIEF DESCRIPTION OF DRAWINGS

The foregoing and other objects, features and advantages of the invention will be apparent from the following description of particular embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION

Embodiments presently disclosed generally relate to content distribution and delivery in a network. The content delivery environment disclosed herein utilizes sets of preconfigured property templates to which a aggregator customer and/or aggregator may be associated. Aspects of the present disclosure are related to an aggregator of CDN services, which may involve an aggregated CDN, federated CDN, or a reseller of CDN services. Aspects of the present disclosure are discussed with reference to a reseller of content delivery network services; however, the present disclosure is more broadly applicable to any form of aggregator of CDN services. The process of adding a new property of the reseller to the CDN then may involve identifying the appropriate template for the configuration needs of the reseller's customer, and then making a DNS entry at the reseller DNS server and CDN servers (or otherwise) to associate the customer with an appropriate supername or virtual IP (VIP) addresses of the CDN. In one implementation, no knowledge of the resold properties is required at the CDN. One set of property templates provides a limited number of property configurations that the reseller may provide to its customers. The property templates provide one or more configurations for the reseller customer to choose from, and according to which the CDN will serve the customer's content. The property coserver also may provide an origin template that may link an incoming request of a customer of the reseller with the customer's origin. A potentially disjoint set of binding coservers associate specific virtual IP addresses of the CDN with a specific property configuration and the reseller. Thus, a request for the reseller customer's content will be processed by a machine associated with the assigned VIP, and will also be processed according to the configurations identified in the property template. Stated differently, the system involves at least two sets of templates related to the CDN. Finally, the system provides for identification of content requests based on the reseller, and also allows for identification of the reseller's customer, and verification of the reseller customer.

In place of using the value of the Host: header in an incoming request to identify the property according to which the request will be processed (as in the case of a direct customer of a CDN), the virtual IP address (VIP) over which the request was received can be used since the VIP is preconfigured and associated with one of a plurality of simplified reseller property coservers, also preselected for the reseller customer, linked to the VIP by way of the binding coservers. The property configuration may itself be a template, allowing per-Host: origin servers to be selected. The mechanisms used to control this are described below.

Figure 1:
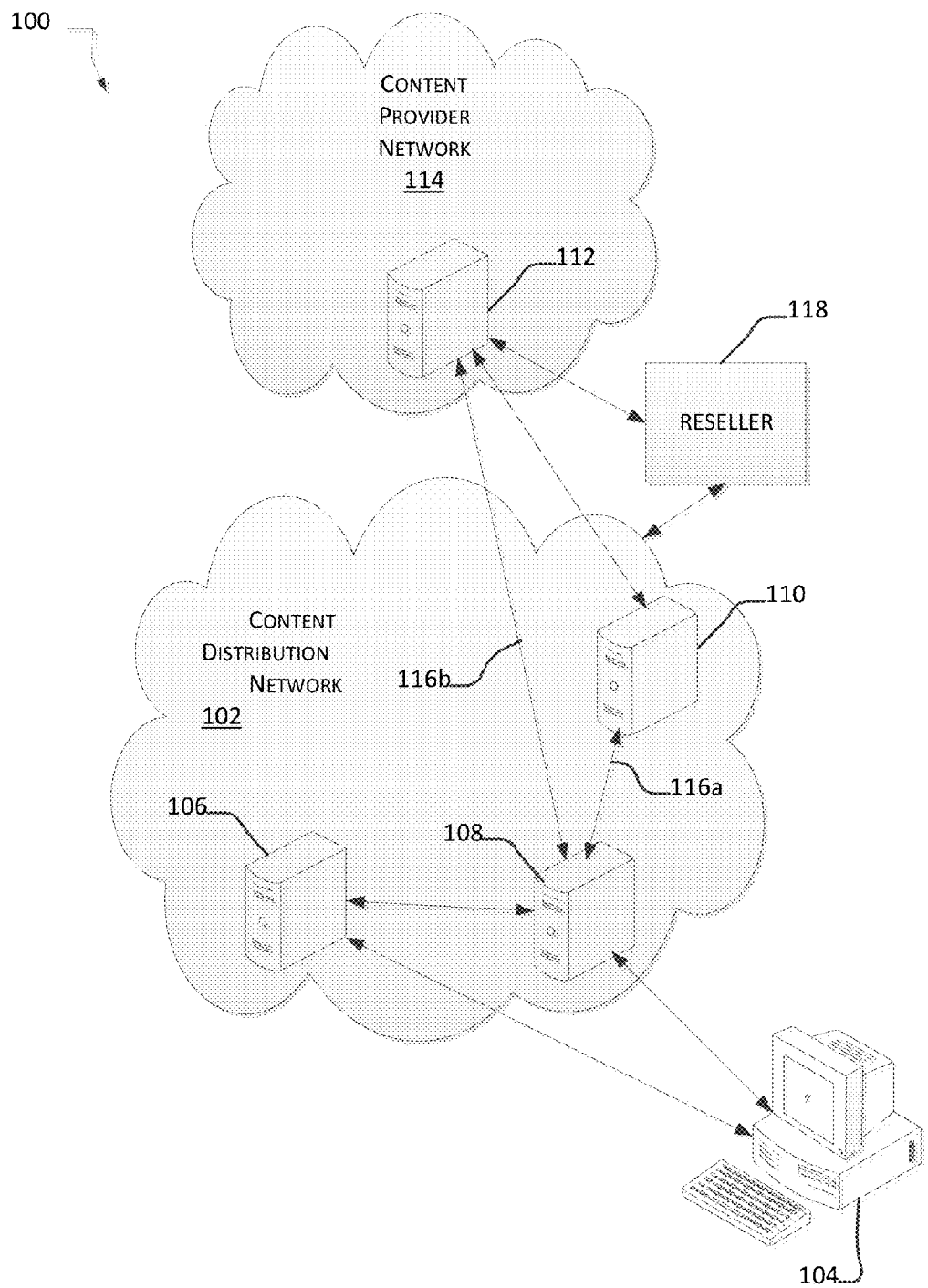
FIG. 1 depicts an example network environment in accordance with embodiments herein.

FIG. 1 illustrates an example network environment 100 suitable for distributing content according to various embodiments, and to provide an introduction to the methodologies by which content is requested and served from a CDN. The term "content" as used herein means any kind of data, in any form, regardless of its representation and regardless of what it represents. The term "content" may include, without limitation, static and/or dynamic images, text, audio content, including streamed audio, video content, including streamed video, web pages, computer programs, documents, files, and the like. Some content may be embedded in other content, e.g., using markup languages such as HTML and XML. Content includes content which is created or formed or composed specifically in response to a particular request. The term "resource" is sometimes used herein to refer to content. A computer user (not shown) may access a content distribution network (CDN) 102 using a computing device, such as a desktop computer 104. The CDN 102 is illustrated as a single network for ease of illustration, but in actual operation, CDN 102 may typically include one or more networks.

For example, network 102 may represent one or more of a service provider network, a wholesale provider network and an intermediate network. The user computer 104 is illustrated as a desktop computer, but the user may use any of numerous different types of computing devices to access the network 102, including, but not limited to, a laptop computer, a handheld computer, a cell phone, a smart phone, a set-top box, a game box, etc.

The network 102 may be capable of providing content to the computer 104. Content may be any of numerous types of content, including video, audio, images, text, multimedia, or any other type of media. The computer 104 includes an application to receive, process and present content that is downloaded to the computer 104. When the user of computer 104 selects a link (e.g., a hyperlink) to a particular content item, the user's web browser application causes a request to be sent to a directory server 106, requesting that the directory server provide a network address (e.g., and Internet protocol (IP) address) where the content associated with the link can be obtained.

In some embodiments, directory server 106 is a domain name system (DNS), which resolves an alphanumeric domain name to an IP address. Directory server 106 resolves the link name (e.g., a universal resource locator (URL) such as http://www.example.com) to an associated network address (e.g., 192.0.2.2) and then notifies the computer 104 of the network address from which the computer 104 can retrieve the selected content item. When the computer 104 receives the network address, the computer 104 then sends a request for the selected content item to a computer, such as streaming server computer 108, associated with the network address supplied by the directory server 106. The DNS may contain any number of directory servers or name servers both within the CDN and out of the CDN.

In the particular embodiment illustrated, streaming server computer 108 is an edge server of the CDN 102. Edge server computer 108 may be more or less strategically placed within the network 102 to achieve one or more performance objectives such as reducing load on interconnecting networks, freeing up capacity, scalability and lowering delivery costs. The edge server 108, for example, may cache content that originates from another server, so that the cached content is available in a more geographically or logically proximate location to the end user. Such strategic placement of the edge server 108 could reduce content download time to the user computer 104.

Edge server computer 108 is configured to provide requested content to a requester. As used herein, the term "requester" can include any type of entity that could potentially request content, whether the requester is the end user computer or some intermediate device. As such, a requester could be the user computer 104, but could also be another computer, or a router, gateway or switch (not shown) requesting the content from the edge server computer 108. As will be understood, requests generated by the computer 104 are typically routed over numerous "hops" between routers or other devices to the edge server computer 108. Accordingly, a requester of content could be any of numerous devices communicably coupled to the edge server computer 108. In some instances, as used herein, the term "requester" will refer to a device that is interacting with a reseller customer, to obtain a resource from a CDN resold by the reseller to the reseller customer.

As part of the function of providing requested content, the edge server computer 108 is configured to determine whether the requested content is available locally from the edge server computer 108 to be provided to the requester. In one embodiment, the requested content is available if the content is stored locally in cache and is not stale. As discussed further below, stale is a condition in which the content is older than a prescribed amount of time, typically designated by a "time-to-live" value.

If the edge server computer 108 determines that requested content is not available (e.g., is either not locally stored or is stale), the edge server computer 108 takes a remedial action to accommodate the request. If the content is locally stored but is stale, the remedial action involves attempting to revalidate the content. If the content is not locally stored or revalidation fails (in the case of stale content), the edge server computer 108 attempts to retrieve the requested content from another source, such as a media access server. A media access server (MAS) is a server computer that may be able to provide the requested content. As discussed herein, the server may use a filltarget template to retrieve the requested content.

In the illustrated embodiment, two possible media access servers are shown: a content distribution server computer 110 and a content origin server 112. Content origin server 112 is a server computer of a content provider, which may be a customer of a CDN reseller 118. In some instances, as discussed herein, the origin server 112 is of the reseller customer. The CDN is notified of the mechanism to determine the reseller customer's origin during initial CDN reseller preconfiguration as discussed. In one implementation, the CDN has no direct information about the customer origin server. The content provider may thus be a customer of a content provider network (e.g., reseller), while the origin server 112 may reside in a content provider network 114, in some instances discussed herein the origin server is maintained outside the customer network.

In some embodiments, the content origin server 112 is an HTTP server that supports virtual hosting. In this manner, the content server can be configured to host multiple domains for various media and content resources. During an example operation, an HTTP HOST header can be sent to the origin server 112 as part of an HTTP GET request. The HOST header can specify a particular domain hosted by the origin server 112, wherein the particular domain corresponds with a host of the requested content.

The content distribution server 110 is typically a server computer within the content distribution network 102. The content distribution server 110 may reside logically in between the content origin server 112, in the sense that content may be delivered to the content distribution server 110 and then to the edge server computer 108. The content distribution server 110 may also employ content caching.

In some embodiments, the edge server computer 108 locates the media access server by requesting a network address from the directory server 106, which in some instances may be of the reseller and also verify the legitimacy of a reseller customer, or another device operable to determine a network address of a media access server that is capable of providing the content. The edge server computer 108 then sends a request for content to the located media access server. Regardless of which media access server is contacted, the media access server can respond to a request for specified content in several possible ways. The manner of response can depend on the type of request as well as the content associated with the request.

For example, the media access server could provide information to the edge computer server 108 that indicates that the locally cached version of the content on the edge computer server 108 is not stale. Alternatively, the media access server could send the specified content to the edge computer server 108, if the media access server has a newer copy of the specified content. In one embodiment, the media access server includes data transport server software, such as a Hypertext Transport Protocol (HTTP) server, or web server. In this case, the edge server computer 108 interacts with the media access server using the data transport protocol employed by the media access server.

With further regard to the communications between the edge server computer 108 and the media access server computer (e.g., either the content origin server 112 or the content distribution server 110), the two servers may communicate over a channel. These channels are illustrated as channel 116*a* between the edge server computer 108 and the content distribution server 110 and channel 116*b* between the edge server computer 108 and the content origin server 112. According to various embodiments described herein, channels 116 are data transport, meaning the channels 116 carry data using a data transport protocol, such as HTTP.

The edge server 108 is configured to retrieve content using a data transport protocol while simultaneously streaming content to the content requester. For example, the edge server computer 108 is operable to simultaneously stream requested content to the requester (e.g., the computer 104) while receiving the content from the origin server computer 112 over the data transport protocol channel 116*b*.

In order to provide efficient CDN reseller services within a CDN as discussed herein, the CDN being resold is first configured for such services. The CDN is configured based on the requirements of the customers of the reseller. Generally speaking, a reseller of CDN services ("cdnreseller" or "reseller") provides a conduit by which a customer of the reseller may obtain CDN services from a CDN that is not operated directly by the reseller. Often, the cdnreseller offers other services to the customer besides CDN services, such as web hosting, DNS and Internet service provider (ISP) services. The CDN maintains references, when providing content pursuant to the configuration, of the cdnreseller and the cdnreseller's customer. Accordingly, the CDN may account for usage by the cdnreseller, and the CDN may advise the reseller of CDN usage by its customers—the customers obtaining CDN services by way of the reseller.

More particularly, a CDN reseller configuration discussed herein may employ pre-defined property templates for the resellers to offer to its customers. In this way, the CDN avoids configuring and managing enormous quantities of discrete properties that would otherwise be required if a conventional direct customer model is used. The CDN may also bind virtual IP addresses to the reseller property templates. Namely, a limited number of property templates (also referred to as "coservers") may be defined and associated with a particular reseller's customers based on a limited set of CDN property specifications or parameters. Accordingly, the limited set of property templates of the CDN provides some configurability as to how the CDN will service requests for the customer's content and manage the content within the CDN. The system also provides an association between a customer alias and a customer origin such that the system may identify the origin (e.g., origin 112) to fill a request on an edge 108 when content is not cached in the CDN. Accordingly, preconfiguration provides a mechanism for determining the origin from which to retrieve requested resources and how to manage the caching and delivery of the resource and other attributes.

Secondly, binding may be achieved by associating VIPs to service specific cdnreseller property templates. Thus, a request received at a VIP may be processed according to the property template of the CDN reseller. Moreover, the property alignment may be maintained for individual reseller customers without establishing unique properties for each reseller customer. The binding coserver may thus include reseller specific binding property attributes rather than generic attributes. Note that it is possible to utilize a property coserver as a binding coserver—generally though, multiple binding coservers per-property coserver may be desirable to provide regional binding.

Property Templates

Figure 2:
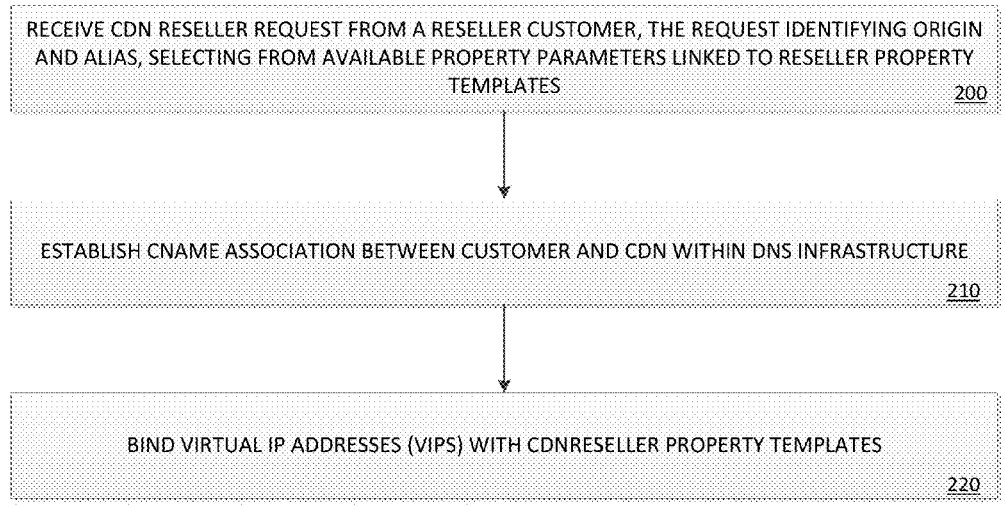
FIG. 2 is a flowchart depicting a method of provisioning a customer of a reseller of a content delivery network.
Figure 3:
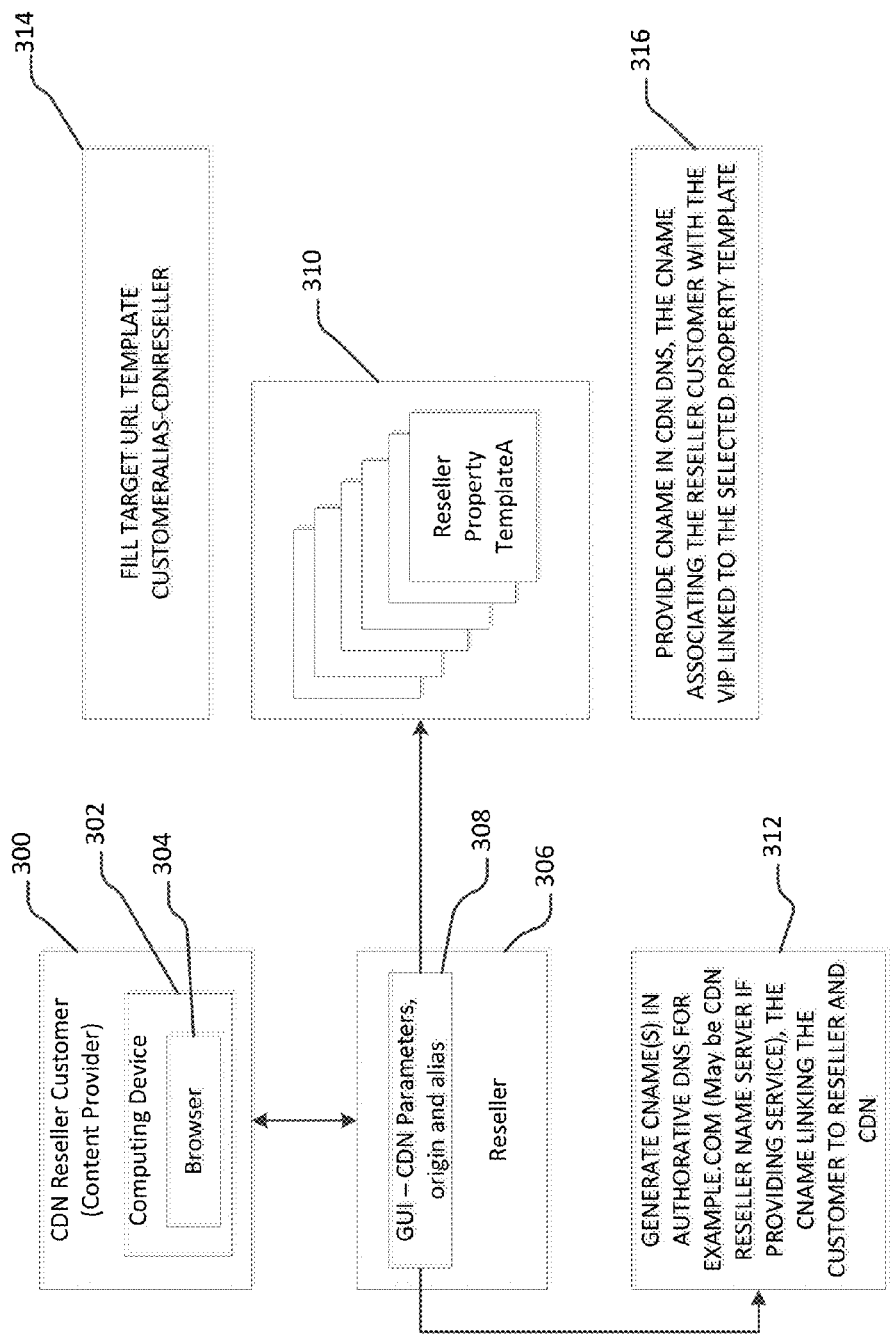
FIG. 3 is a system and flow diagram of components and operations involved in provisioning a customer of a reseller of a content delivery network.
Figure 5:
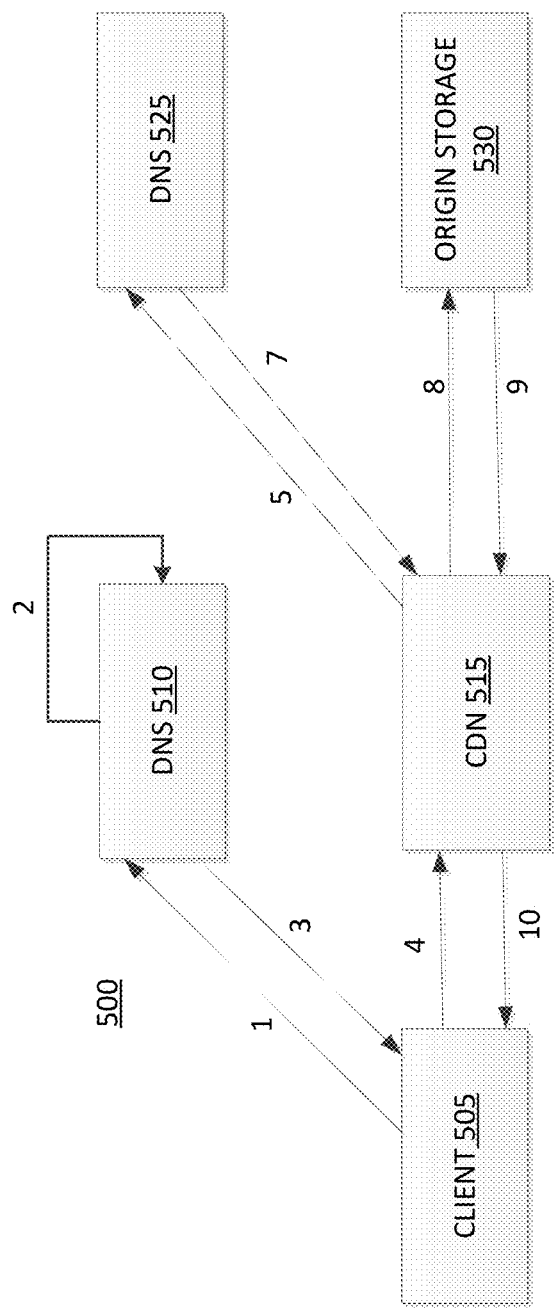
FIG. 5 depicts an example resolution and content request with a CDN reseller configuration in accordance with embodiments herein.

According to an example embodiment, and with reference to FIGS. 2-3 and 5, a set of property coservers are set up by CDN 515 for different sets of configurations/templates. For example, a property coserver can be the authoritative source of a particular resource. The new property coserver configuration/template defines how to dynamically map a request host to the origin host without configuration by the origin network 114. In this vein, the CDN 515 would then maintain a mapping, indirectly, of this special DNS name to the origin storage 530 through a filltarget template as discussed below. Each property coserver is given a supername (such as with attributes of a property template and reseller propertytemplateA.cdnreseller.com, propertytemplateB.cdnreseller.com, etc.) and would be associated with a set of virtual IP addresses (VIPs). The number of VIPs determines the footprint (bindings) of the property (how many locations can service requests for a supername).

To provide a manageable and efficient arrangement, the number of property templates may be limited. In one example, a customer of a reseller may select from a limited number of property templates, where each coserver defines some limited set of content delivery parameters that govern how the CDN will process requests for the reseller customer's content. For example, each coserver may provide some combination of the parameters of:

1. delivery region;
2. cache control setting (time-to-live (TTL));
3. domain protocol;
4. origin protocol;
5. query string setting; and
6. geo-blocking.

The delivery region parameter may define within which regions the CDN will provide content delivery for the customer's content. For example, the customer may select North America, and thus any customer requests with a delivery target within North America will be handled by the CDN pursuant to the parameters of the coserver. The TTL parameter defines how long content should remain cached within an edge server of the CDN, and is a way for a customer to control the freshness of its content. If, for example, TTL is one day, then any content stored at an edge server for more than one day would be considered stale, and the edge server would not deliver the cached content but instead seek a fresh copy of the content from an origin server or otherwise. TTL may be implemented with a cache control header override (CCHO-Mode) parameter that allows the CDN to override some cache control headers that would otherwise make the content uncacheable or interfere with CDN TTL settings. The domain protocol indicates the protocol by which the alias domain communicates (e.g., https). The origin protocol parameter defines the protocol by which the origin communications (e.g., https). The query string setting allows content (resources) to be cached based not on the complete URL including the query string as the cache key but rather allows some or all name value pairs of a query string to be excluded from the cache key so that resources that are unique only based on the query string may be efficiently cached. In one specific example, the query string setting may refer to query string handling mode (QSHMode). A coserver may include some combination of these parameters, and may also include other parameters. The coserver however is meant to be limited in nature and not necessarily provide all of the possible property attributes normally available to a direct customer of the CDN.

Referring now to FIGS. 2-3, to provision a CDN reseller service, a reseller customer 300 operating a computing device 302 with a browser 304, for example, contacts a reseller server 306 operating a web portal, graphical user interface (GUI) or other mechanism 308 whereby the customer 300 may obtain and define reseller CDN services. Within the GUI 308, the customer may provide its origin (e.g., www.example.com), its chosen alias (cdn.example.com) and also select from a limited set of preconfigured property templates (operation 200). The property templates 310 may provide a preselected arrangement of various property parameters including but not limited to delivery region, cache control (TTL), domain and origin protocols, query string setting, and geo-blocking. The property templates may also provide for some level of customization of certain fields. For example, the user may select from the U.S., Europe and Global, as delivery regions. The user may select from various possible protocols such as HTTP, HTTPS, etc. The provisioning component may involve an HTTPS RESTful API whereby the customer or the reseller may provision a new resource (e.g., set up a new customer of the reseller that will use services of the resold CDN), alter an existing resource, and delete an existing resource.

The provisioning operations also involve CNAMEing 312 or otherwise creating a mechanism by which the alias is associated with the CDN maintaining an association with the customer and reseller (operation 210). Stated differently, the system needs to get a content requester 104 to the right binding (e.g., server 108) when someone tries to resolve the customer's CDN alias (e.g., cdn.example.com). To do this, a CNAME record 312 may be established between the customer and the CDN reseller within the DNS infrastructure responsible for resolving requests related to the customer domain. For example, a first CNAME record in the form of: cdn.example.com CNAME IN cdn.example.com.cdn.cdnreseller.com may be established in the authoritative name servers for the customer. Here, the record includes reference to both the customer alias (used when it seeks to have content served from the CDN) and a reference to the cdnreseller. In some instances, the authoritative name servers will be those of the reseller. The CDN reseller may then create a second CNAME record between the customer/reseller and the CDN, so they would have a similarly generic policy of for example: cdn.example.com.cdn.cdnreseller.com CNAME IN cdn.example.com.cdnreseller.c.CDN.net. Here, the record includes a reference to the customer alias, the reseller and the CDN itself from which the reseller has resold CDN services to the customer. It should be noted that the CNAME from the alias may not be direct to the CDN. Instead, the system uses a CNAME into a generic intelligent traffic manager (ITM) name appropriate for the customer property (example: cdn.example.com.cdnreseller.c.CDN.net). The second CNAME to the appropriate bindings is then created, or that name could simply be a CDN supername or other record identifying a correct binding coserver.

The initial two-CNAME chain is for management convenience at the reseller. One benefit is that if the CDN makes a different name available for the reseller, only a single change is needed within the DNS system of the reseller to move all of its customers that were using the old name to the new (rather than having to change a potential large number of entries if a direct mapping is needed). Similarly, if the reseller decides to move from one DNS name to another amongst the set previously provided by the CDN, they can more easily do so. Additionally, another benefit stems from when the DNS of example.com is managed by the owners of example.com rather than directly by the reseller. With this style, the customer creates a CNAME from cdn.example.com to something within their resellers network (e.g., cdn.example.com.cdn.cdnreseller.com) which they are more likely to be comfortable with rather than handing things off directly to the CDN (with which they may have no relationship). So, it makes things 'cleaner' for the customer of the reseller. Finally, the CNAME chain also allows the reseller to manage things a more directly and allows the reseller to perform multi-CDN share balancing, etc.

The property coserver template also should define how to dynamical map a request host (domain) to the origin host (origin) without configuration by the CDN reseller. Namely, during set-up, the cdnreseller customer identifies the origin host (e.g., www.example.com) and the alias host (e.g. cdn.example.com), which will be associated with any resource request from the customer to the CDN. Accordingly, any resource request using the customer's CDN alias will include a host header of cdn.example.com, and which may be used to identify the associated origin of www.example.com. A filltarget template 314, which may be associated with the reseller templates, combines the customer alias with a cdnreseller extension (a sub domain, for example), the combination of which may be resolved through DNS (e.g., reseller DNS) to locate the customer origin to fill any request. The examples herein are set forth with respect to the template being formed through a combination of the host header and a subdomain of the reseller. However, it is possible to use other attributes of the request in conjunction with some attribute of the reseller to generate the fill target and thereby contact the origin. By updating reseller DNS to process a completed filltarget template URL, a valid result from the DNS implicitly confirms the legitimacy of the reseller customer relationship (i.e., the resource is for a valid customer of the reseller) and of the request to the CDN. For example, the filltarget template 314 may specify the fill target address as ${host}.origin.cdnreseller.com; when a request is received at the CDN for a resource, the value ${host} in the filltarget template is replaced by the received HTTP HOST header. So a request for cdn.example.com will attempt to fill from, in this example, cdn.example.com.origin.cdnreseller.com. In one specific implementation, that would be a CNAME to, in this example, the origin server www.example.com. The name template in the filltarget template 314 would, in the implementation, be under the control of the reseller. This mechanism allows the target of the CNAME to be to a name outside the DNS control of the reseller, for example if the owners of example.com manage their own DNS service.

More particularly, when referencing a coserver, the main property configurations work as normal, for specifying request and fill-side handling modes (caching policy, query string handling, etc.). The filltarget template, however, may be employed to define the fill target (the origin server from which to obtain content if the edge cache does not have a valid copy, for example). As will be discussed in more detail below, an incoming resource request is associated with a property coserver due to the VIP over which the request was received as opposed to a feature of the request. Cache fills may be performed to a template origin server fill target name. In the degenerative case, this could be a constant (if all content from the reseller's customers could be filled from a single origin server IP address). In the general case, the origin servers can be scattered across multiple sites within the reseller cloud, or even off-net.

Stated differently, to be able to identify which names are legitimate without requiring per-name configuration within the caching engine, a DNS solution is described. A template origin server fill target is configured, and legitimate subscribers of the reseller configured into matching names. For instance, a subdomain of cdnreseller.com may be used (example: cdn.cdnreseller.com). In order to fill content from the host cdn.example.com (cdnreseller's customer) a template is used to generate a fill request where the template includes origin.cdnreseller.com and it is combined with cdn.example.com, to form cdn.example.com.origin.cdnreseller.com. The reseller defines a CNAME for that URL or otherwise defines the URL in its DNS, so that if that name resolves, then the CDN caching engine knows that this is a legitimate CDN reseller customer; if the name does not resolve, the request can be rejected as invalid. The origin and alias are provided by the customer so that the CDN recognizes the request from the alias host and may apply it to the filltarget template. The filltarget template may be generic to all property templates or each property template may be associated with a distinct filltarget template.

For SSL, the CDN may have a shared certificate associated with a hostname of something like secure.cdnreseller.com and the incoming request would then identify the origin server from the first path element, which may be of the form: https://secure.cdnreseller.com/example/. The property coserver configured around the HTTPS property would have a different origin server template—e.g., $(TOPDIR).cdnresellerhttps.com and the CDN would include example.cdnresellerhttps.com to point to a secure-origin.example.com.

This origin server identification DNS name could alternatively be managed within an ITM policy for reasons of both opacity and to minimize the lift on the part of the CDN reseller. For the sake of example, the origin server identification domain may be origin.cdnreseller.com.

The CDN provides some number (depending on unique property configuration parameter needs) of initial property coservers (configurations/templates) from which to select. For example:

1. Property template A: no CCHOMode for the origin server specified caching policy,
 2. Property template B: 10 minute TTL on all resources
 3. Property template C: 10 minute TTL with QSHMode enabled
 4. Property template D: 24 hour TTL with a Domain Protocol of HTTPS
 5. Property template E: 12 hour TTL with a Origin Protocol of Match Request
 6. Property template F: 60 minute TTL with QSHMode enabled Each template (coserver) may also be defined with other default parameters. For example, each property coserver may allow for flash or mp4 'scrubbing' to be used. Moreover, other parameters of each coserver may be included, with these parameters simply being examples. In any event, in the example discussed, there are six (A-F) property templates defined, each with a different set of parameters in some combination of the seven example parameters introduced above.

When a new CDN reseller customer is to be added onto the CDN, the appropriate coserver is selected based upon the configuration requirements of that customer, as discussed above where the customer selects a template. Alternatively, the system may be configured to provide a set of queries to the customer, such as through the GUI 308, the answers and selections being used to select a preconfigured templated best matching the customer selections.

Upon addition of the customer, a DNS entry is added into the origin.cdnreseller.com domain (reseller name servers, for example) that would indicate from where the cache fills should be directed for the alias hostname associated with that customer. So, for example, the reseller's name servers may include a CNAME to the origin (e.g., www.example.com) relying on initially be directed to the name servers from the filltarget template. Also, if the customer uses the name (alias) cdn.example.com for those resources that should be served via the CDN, the name cdn.example.com.origin.cdnreseller.com may also be created within an intelligent traffic monitor (ITM) to identify the origin server for cache fills.

Setting up Binding Coservers:

Referring to FIG. 2, setting up the CDN to handle reseller services based on the concepts discussed herein, may also involve binding VIPs with CDN reseller property templates (operation 220). Referring again to the six cdnreseller property templates, in this instance four new 'reseller' VIPs are created, and could be assigned to the same set of machines (initially) but could also be split across the set of clusters assigned to the reseller. To facilitate binding, a second type of coserver that may be employed is a binding coserver that connects the customer's alias name (e.g., cdn.example.com) to the appropriate VIPs on CDN clusters that are associated with the customer's property coserver (based on selections made by the customer). Continuing with the same example embodiment, CDN 102 would create a set of DNS names (e.g., four names) for each of the six example property coservers (A-F), with each may also be distributed across multiple slices (e.g., 6):

slice1.propertytemplateA.cdnreseller.NA.c.CDN.net
slice2.propertytemplateA.cdnreseller.NA.c.CDN.net
. . .
slice4.propertytemplateA.cdnreseller.NA.c.CDN.net
slice1.propertytemplateB.cdnreseller.EU.c.CDN.net
slice2.propertytemplateB.cdnreseller.EU.c.CDN.net
. . .
slice4.propertytemplateB.cdnreseller.EU.c.CDNnet
. . .
slice1.propertytemplateF.cdnreseller.GLOBAL.c.CDN.net
slice2.propertytemplateF.cdnreseller.GLOBAL.c.CDN.net
. . .
slice4.propertytemplateF.cdnreseller.GLOBAL.c.footprint.net The reseller would then assign each customer to one slice, by creating a CNAME from, for example, cdn.example.com. cdn.cdnreseller.com to a selected slice name. The geographic selection made by or on behalf of the reseller customer would determine which group of names to select amongst (e.g., slice[1-4].propertytemplateA.cdnreseller.NA.c.CDN.net if only North America delivery was to be utilized); which slice number would be based upon reseller policy—selection could be random, round-robin, or based on the library size of the resellers customer. In the preferred embodiment, load on the CDN would be evenly distributed over the slices.

Note that the set of DNS names could be made less obscure; for instance, propertytemplateA' could be replaced with 'noccho', 'propertytemplateB' with '10 min' and 'propertytemplateC' with '10minq.' Further note that 'c' indicates a canonical name or "CNAME." In this instance, the delivery region is also identified in the URL as NA (North America), EU (Europe) and GLOBAL (the worldwide CDN network). According, in an alternative, geographic restrictions (e.g., some content only served to North America) could be introduced at the 'slice' level rather than at the coserver level (e.g., slice1.propertytemplateA.NA.cdnreseller.c.CDN.net where NA refers to North America).

As discussed herein, a CNAME chain may be employed to CNAME from the alias host (e.g., cdn.example.com) to a CDN reseller name (e.g., cdn.example.com.cdn.cdnreseller. com), which would then CNAME to the CDN (e.g., cdn.example.com.cdn.cdnreseller.com CNAME IN cdn.example. com.cdnreseller.c.CDN.com). The binding coserver identifies the binding between the reseller and customer to the reseller property template for the customer and the CDN VIP for the reseller property template. The binding may be reflected in a CNAME record such as:

cdn.example.com.cdnreseller.c.CDN.com CNAME IN slice1.propertytemplateA.cdnreseller.NA.c.CDN.net. The CNAME will resolve to a VIP associated with propertytemplateA of the cdnreseller.

In the case of the front-end DNS being handled by ITM, such slices would not need to be preconfigured. When the reseller is providing DNS, such slices provide flexibility of binding management without needing to have the reseller alter existing DNS entries at some point in time; when using ITM, CDN operations may alter the existing names to split traffic across multiple slices when and if the need arises. CNAMES may be managed with the reseller DNS, other DNS, or maybe managed with an ITM of the CDN. An example ITM (also referred to as an adaptive traffic controller (ATC)) is described in co-pending U.S. patent application Ser. No. 10/259,497, filed Sep. 30, 2002, and titled "Configurable Adaptive Global Traffic Control And Management," (published as US 2003-0065762 A1); and in U.S. patent application Ser. No. 11/976,648, filed Oct. 26, 2007, titled "Policy-based content delivery network selection," and in U.S. patent application Ser. No. 12/880,324 titled "Handling Long-Tail Content in a Content Delivery Network (cdn)" (collectively the "ITM applications"), the entire contents of each of which have been incorporated herein by reference for all purposes. A system such as ITM (described in the ITM patent applications mentioned above), allows a kind of hostname (called a supername) to refer to multiple servers, and resolves the supername to a nearby server.

Figure 4:
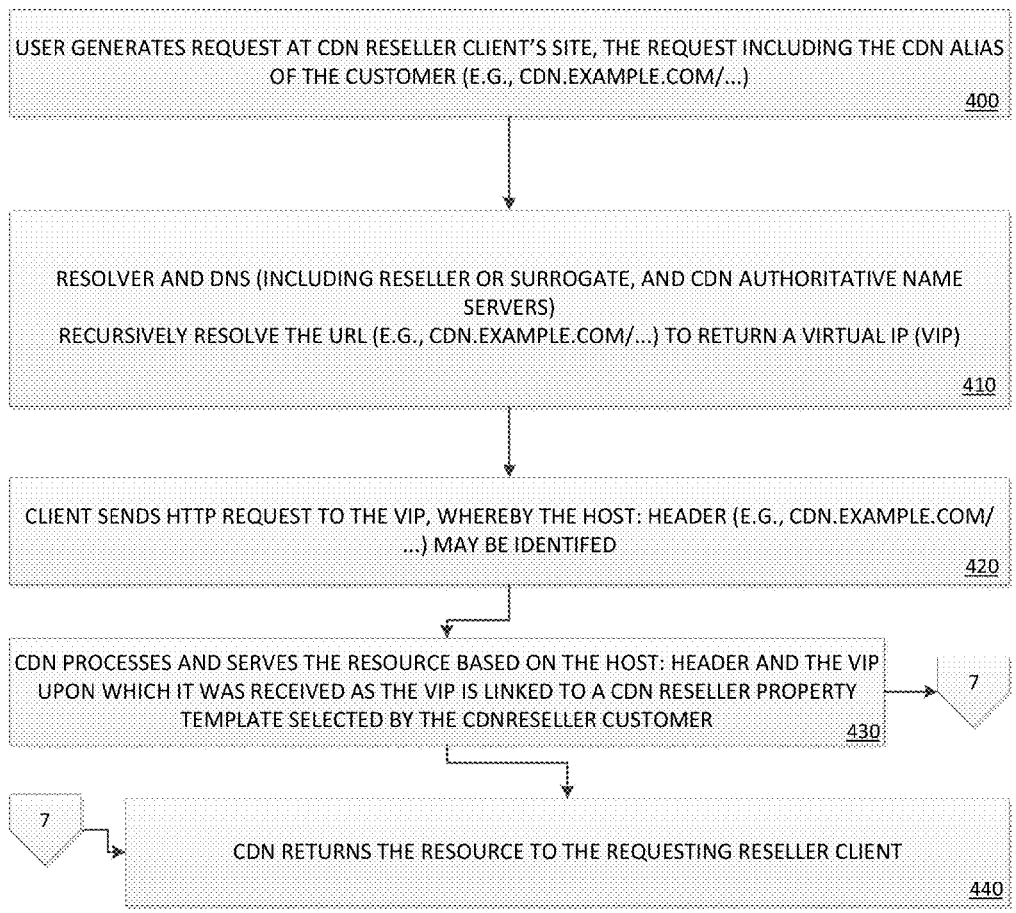
FIG. 4 is a flowchart depicting a method of processing a content request to a content delivery network, the request for content of a customer of a reseller of the content delivery network.
Figure 6:
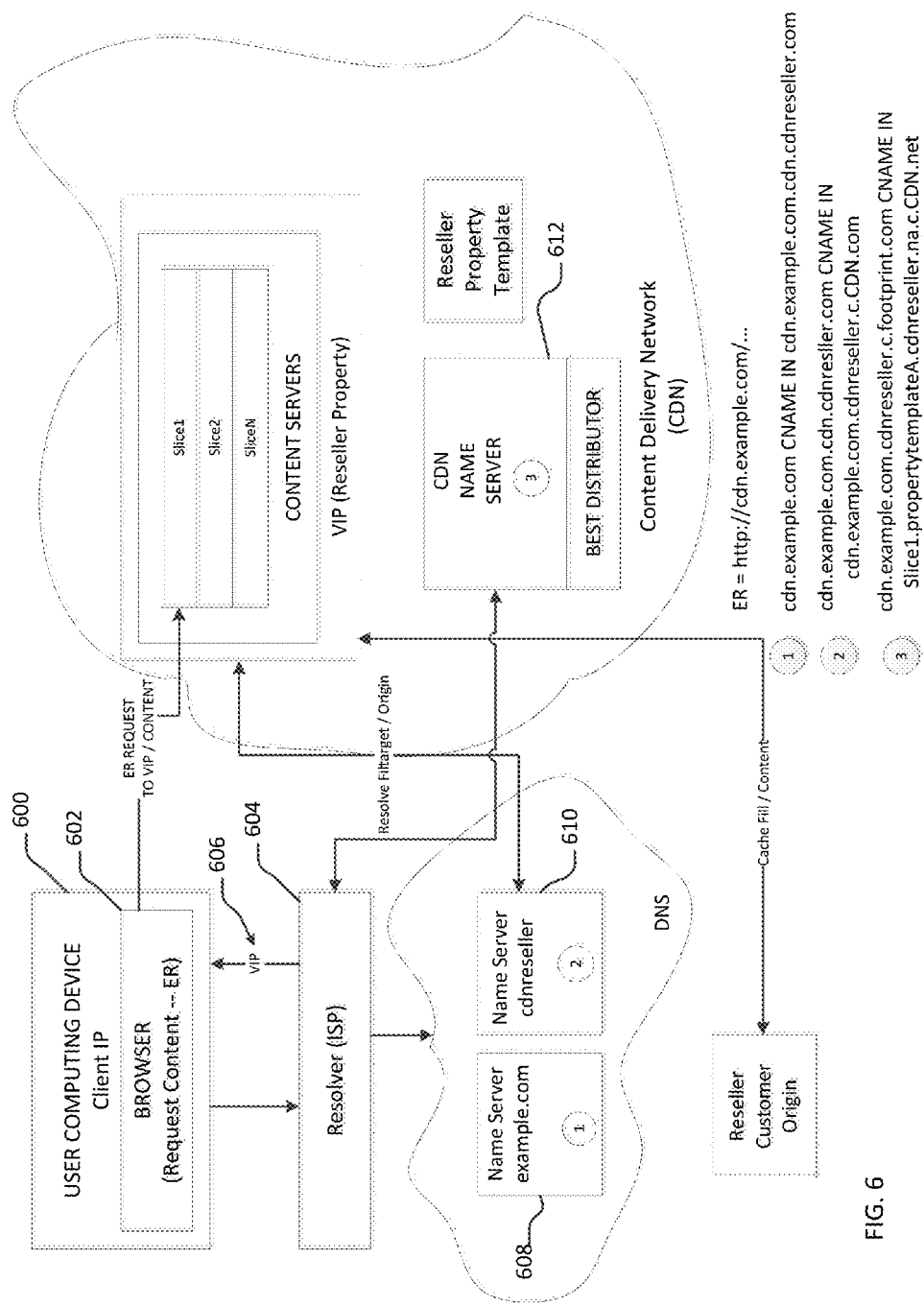
FIG. 6 is a system and flow diagram of a processing a content request to a content delivery network, the request for content of a customer of a reseller of the content delivery network.

Referring now to FIGS. 4 and 6, an example request flow may be performed as follows. A user generates a content request (operation 400). As illustrated, the request may be generated from a computing device 600 operating a browser 602. In one particular example, the user has accessed a reseller customer's page and has requested content associated with the preconfigured CDN host domain (e.g., cdn.example. com/ . . . ) So, for instance, an HTML page within the browser may include one or more links (embedded resources (ER)) to content to be served from the CDN. Those links may include a reference to cdn.example.com.

Next, the request is resolved by a resolver 604 and returns a VIP 606 directing the browser to contact a CDN device that may serve the requested resources based on the reseller property template of the customer (operation 410). Generally speaking, the client's resolver communicates with one or more components of DNS to resolve the request. In one specific instance, DNS includes a CNAME to the CDN reseller. For example, cdn.example.com CNAME IN cdn.example.com.cdn.cdnreseller.com. The first CNAME may be maintained in the authoritative name server 608 of the customer domain (e.g., example.com). The reseller may then maintain, in its name servers 610, a second CNAME to the CDN. cdn.example.com.cdn.cdnreseller.com CNAME IN cdn.example.com.cdnreseller.c.CDN.net. At this point, the authoritative name server 610, or other component of the CDN, is contacted to provide a VIP 606 according to the established binding coserver. As shown, the CNAME includes the customer domain (cdn.example.com) as well as a designation of the cdn reseller (e.g., . . . com.cdnreseller. c. . . . ). Accordingly, the CDN may identify the binding coserver and build or otherwise provide a final CNAME for a VIP for the devices that will serve the content. In the case of multiple slices for each coserver, slices may be assigned in a round robin policy. Hence, for example, the final CNAME may be slice1.propertytemplateA.cdnreseller.NA.c.CDN.net, which resolves to a specific VIP.

The user device than initiates an HTTP request to the VIP (operation 420). The request includes the host: header (e.g., cdn.example.com). Because the VIP is linked to the property template, the content may be served in accordance with the property template associated with the reseller customer. If the content is cached, it will be served.

Figure 7:
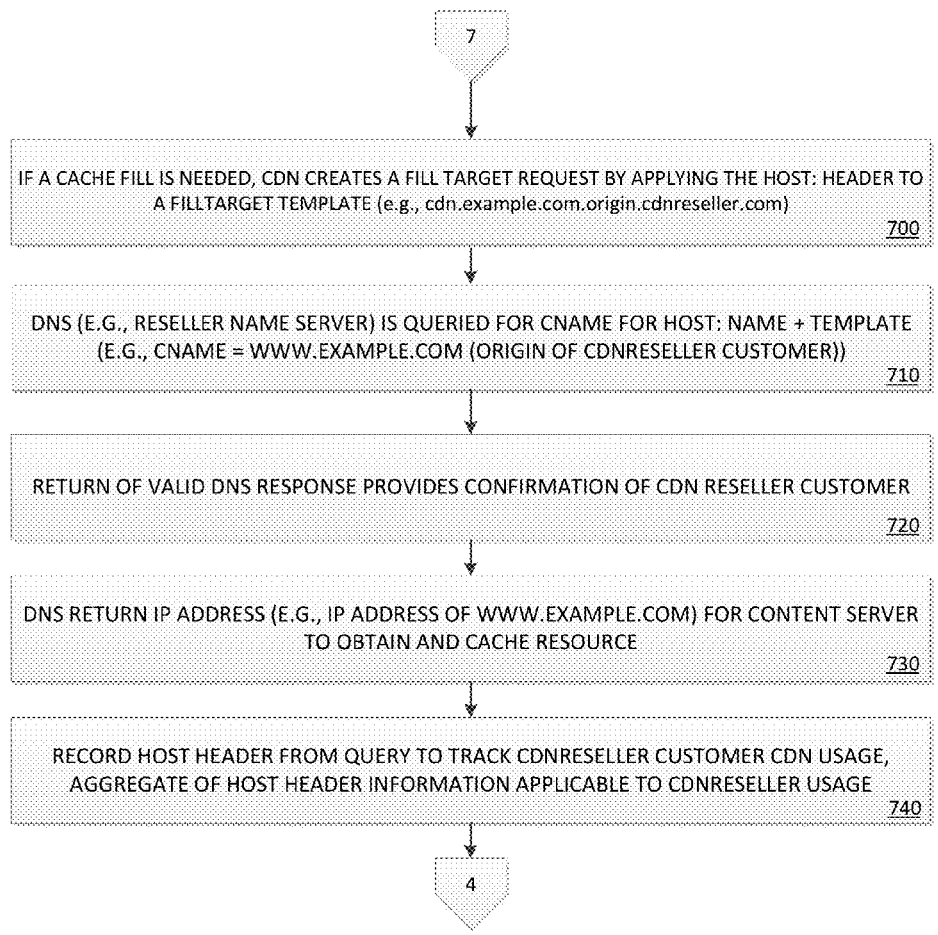
FIG. 7 is a flowchart depicting a method of performing a cache fill for content of a customer of a reseller of a content delivery network, the content deliver network not having direct knowledge of the origin of the content to fill perform the cache fill.

Referring now to FIG. 7, on a cache miss, the server attempts to obtain the requested content using the filltarget template (operation 700). The configuration of the filltarget template allows the CDN edge to create the outbound fill target as $host.origin.cdnreseller.com by applying the host header with the fill template of the cdn reseller (${host}.origin.cdnreseller.com). DNS, which may involve the authoritative name server of the cdnreseller, is contacted to resolve the generated hostname (operation 710). If DNS includes a CNAME for the generated fill target, then the DNS reply implicitly confirms the validity of the request (operation 720). Namely, the cdn reseller requires a CNAME for each concatenated fill target for each of its valid customers. Moreover, the reseller receives the customer origin (e.g., www.example.com) at provisioning and thus can create the proper DNS entries at successful provisioning. Ultimately, for a valid customer, the IP address of the customer's origin is returned to the requested CDN device (operation 730) whereby the content may be obtained at the IP address of the origin and then delivered to the requesting user (operation 440)). Depending on the property coserver, the content may then also be cached based on a TTL parameter of the coserver if present.

The CDN may track discrete reseller customers through identifying hosts headers (aliases) on specific VIPs, which receipt of a request at a VIP associates a customer with a reseller. With the reseller customer and reseller information, the CDN can provide per customer usage data for billing and send that information to the CDN reseller. Such usage data may include quantity of outbound data served from the CDN, (e.g., GB of outbound data) for each customer, number of CDN transactions for each customer, the number of CDN transaction for each zone (e.g., zone 1—European/North American locations, zone 2—all other locations).

FIG. 5 provides a different perspective on the concepts discussed herein, and an example request flow. As shown, client 505, which is operating a computing device capable of requesting content from the reseller customer, is in communication with a CDN 515 and DNS 510. At step 1, the client resolves the name cdn.example.com. At step 2, the client's DNS server 510 recursively resolves cdn.example.com via the DNS resolver which is CNAME'ed to cdn.example.com. cdn.cdnreseller.com. The CDN reseller authoritative DNS server CNAMEs to the CDN (cdn.example.com.cdnreseller.c.CDN.net). The CDN's authoritative DNS server returns a VIP appropriate for that user and a list of North American binding coserver VIPs geographically close to the user. So, at step 3, the clients DNS server returns the list of binding coserver VIPs provided by the CDN DNS resolver authoritative DNS server.

In step 4, the client 505 sends an HTTP request to the CDN 515 to the provided VIP, the Host: header in the HTTP request contains cdn.example.com. The CDN recognizes that the request came in on a special binding coserver VIP which is used to select the appropriate property coserver and deliver the content to the client 505. On a cache miss, the configuration of that property coserver allows the CDN edge to create the outbound fill target as $host.origin.cdnreseller.com.

Accordingly, in step 5, the CDN 515 performs a DNS query which hits the ITM policy mapping cdn.example.com.origin.cdnreseller.com to www.example.com or other DNS functionality of the CDN. In step 6, the authoritative DNS service 525, which may be the reseller DNS, resolves www.example.com to the IP address of the server hosting the service for www.example.com. In step 7, the DNS system returns the IP address of www.example.com as IP www.www.yyy.zzz. At this point, in step 8, the CDN forwards the HTTP request to www.www.yyy.zzz (e.g., origin storage 530 designated by the customer). In step 9, origin storage provides the response (e.g., the requested content), which is cached by the CDN for subsequent lookups. In step 10, the CDN (e.g., edge server 108) returns the resource to the client 505.

Figure 8:
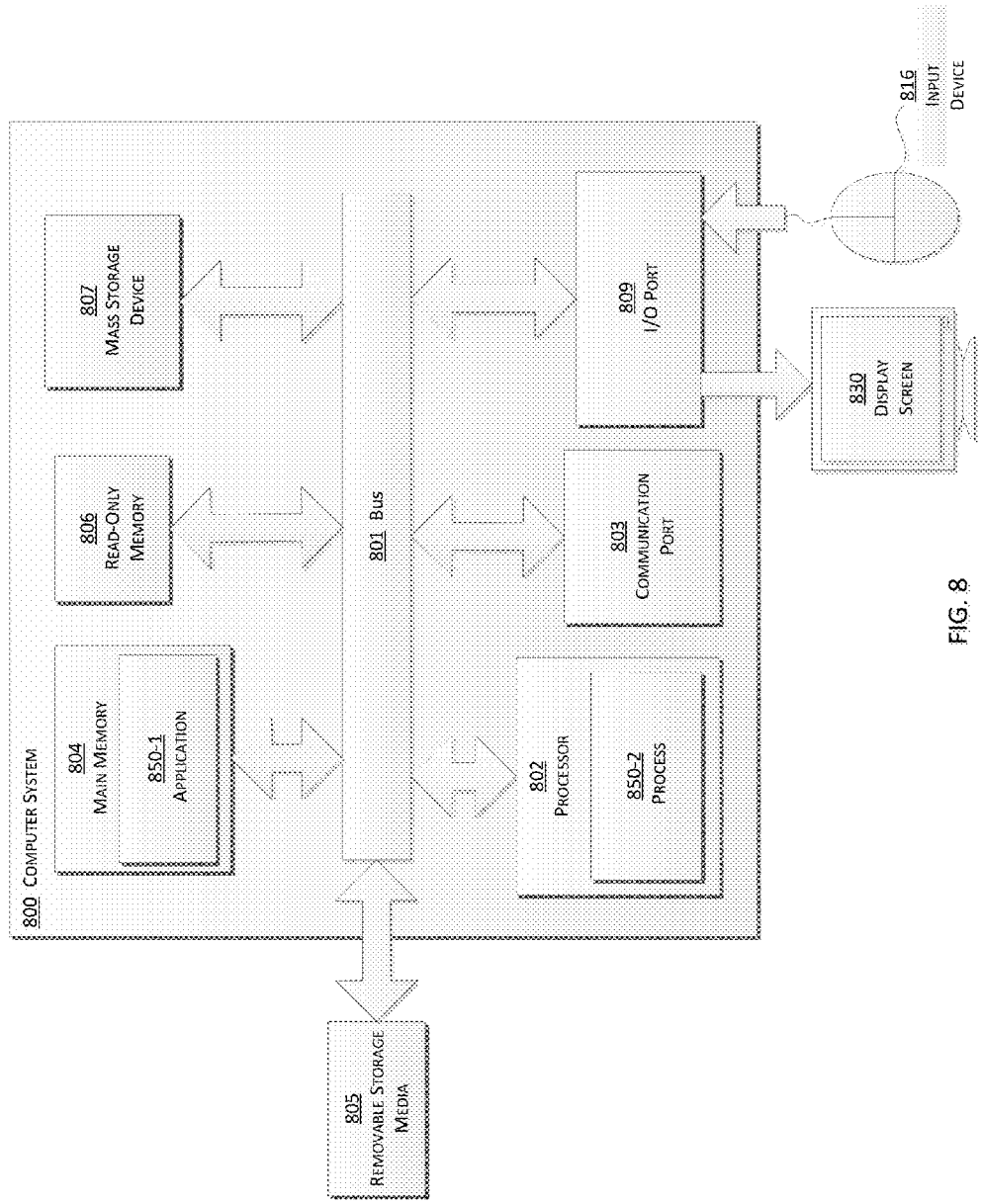
FIG. 8 depicts an example computer system in accordance with embodiments herein.

FIG. 8 is example schematic diagram of a computing system implementing a server, or other computing device, such as DNS server, ISP resolver, CDN resolver, DNS devices, user devices, reseller devices, etc. that may be used to preconfigure coservers, process content requests, serve content, and otherwise perform the processes discussed herein. The computing system includes a bus 801 (i.e., interconnect), at least one processor 802, at least one communication port 803, a main memory 804, a removable storage media 805, a read-only memory 806, and a mass storage device 807. Processor(s) 802 can be any known processor, such as, but not limited to, an Intel® Itanium® or Itanium 2® processor(s), AMD® Opteron® or Athlon MP® processor(s), or Motorola® lines of processors. Communication port 803 can be any of an RS-232 port for use with a modem based dial-up connection, a 10/100 Ethernet port, a Gigabit port using copper or fiber, or a USB port. Communication port(s) 803 may be chosen depending on a network such as a Local Area Network (LAN), a Wide Area Network (WAN), or any network to which the computer system connects. The server may be in communication with peripheral devices (e.g., display screen 830, input device 816 via Input/Output (I/O) port 809.

Main memory 804 can be Random Access Memory (RAM) or any other dynamic storage device(s) commonly known in the art. Read-only memory 806 can be any static storage device(s) such as Programmable Read-Only Memory (PROM) chips for storing static information such as instructions for processor 802. Mass storage device 807 can be used to store information and instructions. For example, hard disks such as the Adaptec® family of Small Computer Serial Interface (SCSI) drives, an optical disc, an array of disks such as Redundant Array of Independent Disks (RAID), such as the Adaptec® family of RAID drives, or any other mass storage devices, may be used.

Bus 801 communicatively couples processor(s) 802 with the other memory, storage and communications blocks. Bus 801 can be a PCI/PCI-X, SCSI, or Universal Serial Bus (USB) based system bus (or other) depending on the storage devices used. Removable storage media 805 can be any kind of external hard drives, floppy drives, IOMEGA® Zip Drives, Compact Disc-Read Only Memory (CD-ROM), Compact Disc-Re-Writable (CD-RW), Digital Video Disk-Read Only Memory (DVD-ROM), etc.

Embodiments herein may be provided as a computer program product, which may include a machine-readable medium having stored thereon instructions which may be used to program a computer (or other electronic devices) to perform a process. The machine-readable medium may include, but is not limited to, floppy diskettes, optical discs, CD-ROMs, magneto-optical disks, ROMs, RAMs, erasable programmable read-only memories (EPROMs), electrically erasable programmable read-only memories (EEPROMs), magnetic or optical cards, flash memory, or other type of media/machine-readable medium suitable for storing electronic instructions.

As shown, main memory may be encoded with an application 808 that supports functionality as discussed above with respect to the various figures and elsewhere. For example, in one embodiment, the application 808 may include or otherwise implement the various processes and/or instructions described herein. The application 808 (and/or other resources as described herein) can be embodied as software code such as data and/or logic instructions (e.g., code stored in the memory or on another computer readable medium such as a disk) that supports processing functionality according to different embodiments described herein. During operation of one embodiment, processor(s) 802 accesses main memory 804 via the use of bus 801 in order to launch, run, execute, interpret or otherwise perform the logic instructions of the application 808. Execution of the application 808 produces processing functionality in application process 850-2. In other words, the pricing process 850-2 represents one or more portions of the pricing application 850-1 performing within or upon the processor(s) 802 in the computer system 800.

The description above includes example systems, methods, techniques, instruction sequences, and/or computer program products that embody techniques of the present disclosure. However, it is understood that the described disclosure may be practiced without these specific details. In the present disclosure, the methods disclosed may be implemented as sets of instructions or software readable by a device. Further, it is understood that the specific order or hierarchy of steps in the methods disclosed are instances of example approaches. Based upon design preferences, it is understood that the specific order or hierarchy of steps in the method can be rearranged while remaining within the disclosed subject matter. The accompanying method claims present elements of the various steps in a sample order, and are not necessarily meant to be limited to the specific order or hierarchy presented.

It is believed that the present disclosure and many of its attendant advantages should be understood by the foregoing description, and it should be apparent that various changes may be made in the form, construction and arrangement of the components without departing from the disclosed subject matter or without sacrificing all of its material advantages. The form described is merely explanatory, and it is the intention of the following claims to encompass and include such changes.

While the present disclosure has been described with reference to various embodiments, it should be understood that these embodiments are illustrative and that the scope of the disclosure is not limited to them. Many variations, modifications, additions, and improvements are possible. More generally, embodiments in accordance with the present disclosure have been described in the context of particular implementations. Functionality may be separated or combined in blocks differently in various embodiments of the disclosure or described with different terminology. These and other variations, modifications, additions, and improvements may fall within the scope of the disclosure as defined in the claims that follow.

What is claimed is:

1. A content delivery method comprising:
   receiving a selection of one or more property parameters associated with a pre-established property template, the property template associated with processing a content request to a content delivery network and bound to a virtual IP (VIP) address, the selection being received from a customer of an aggregator of services of a content delivery network;
   receiving an origin and an alias of the origin, the origin for obtaining content of the customer of the aggregator of services of the content delivery network, the alias of the origin used by the customer of the aggregator for designating content to be served by the content delivery network; and
   establishing at least one first domain name system (DNS) record outside the authoritative name servers of the content delivery network, the at least one first DNS record creating an association between the alias of the origin and the origin such that a fill request from the content delivery network may be processed at the origin and at least one second DNS record, the at least one second DNS record creating an association between the alias of the origin and the VIP address bound to the property template.

2. The method of claim 1 wherein the at least one first DNS record comprises a combination of the alias and a domain of the aggregator, and the at least one first DNS record is established in an authoritative name server of the aggregator.

3. The method of claim 2 wherein the at least one first DNS record comprises the combination of the alias and the domain of the aggregator is only established for a valid customer of the aggregator of services of the content delivery network.

4. The method of claim 3 wherein the fill request from the content delivery network may be processed at the origin without the content delivery network having direct information as to the origin.

5. The method of claim 1 wherein the at least one first DNS record comprises a CNAME record.

6. The method of claim 1 further comprising establishing at least one third DNS record within the authoritative name servers of the customer of the aggregator, the at least one third DNS record creating an association between the alias of the origin and the aggregator of services of the content delivery network.

7. The method of claim 6 wherein a name server of the aggregator of services of the content delivery network is the authoritative name server of the customer of the aggregator.

8. The method of claim 1 wherein the property template is one of a discrete plurality of property templates for the aggregator, each property template defining a discrete plurality of property configurations.

9. The method of claim 8 wherein the discrete plurality of property configurations include delivery region, cache control setting, domain protocol, origin protocol, query string setting and geo-blocking.

10. The method of claim 9 further comprising receiving a content request for content of the customer of the aggregator of services of the content delivery network, the content request received at the VIP address bound to the pre-established property template such that the content request may be processed in accordance with the selected parameters and without the content delivery network maintaining a direct property for the customer of the aggregator.

11. The method of claim 1 wherein the aggregator is a reseller.

12. The content delivery method of claim 1 wherein the at least one second DNS record is established outside the authoritative name servers of the content delivery network.

13. A non-transitory computer readable media comprising computer executable instructions to perform a method of managing content delivery in a computer network comprising:
   receiving a selection of one or more property parameters associated with a pre-established property template, the property template associated with processing a content request to a content delivery network and bound to a virtual IP (VIP) address, the selection being received from a customer of an aggregator of services of a content delivery network;
   receiving an origin and an alias of the origin, the origin for obtaining content of the customer of the aggregator of services of the content delivery network, the alias of the origin used by the customer of the aggregator for designating content to be served by the content delivery network; and
   establishing at least one first domain name system (DNS) record outside the authoritative name servers of the content delivery network, the at least one first DNS record creating an association between the alias of the origin and the origin such that a fill request from the content delivery network may be processed at the origin and at least one second DNS record, the at least one second DNS record creating an association between the alias of the origin and the VIP address bound to the property template.

14. The non-transitory computer readable media of claim 13 wherein the at least one first DNS record comprises a combination of the alias and a domain of the aggregator, and the at least one DNS record is established in an authoritative name server of the aggregator.

15. The non-transitory computer readable media of claim 14 wherein the at least one first DNS record comprises the combination of the alias and the domain of the aggregator is only established for a valid customer of the aggregator of services of the content delivery network.

16. The non-transitory computer readable media of claim 15 wherein the fill request from the content delivery network may be processed at the origin without the content delivery network having direct information as to the origin.

17. The non-transitory computer readable media of claim 13 wherein the at least one first DNS record comprises a CNAME record.

18. The non-transitory computer readable media of claim 13 further comprising establishing at least one third DNS record within the authoritative name servers of the customer of the aggregator, the at least one third DNS record creating an association between the alias of the origin and the aggregator of services of the content delivery network.

19. The non-transitory computer readable media of claim 18 wherein a name server of the aggregator of services of the content delivery network is the authoritative name server of the customer of the aggregator.

20. The non-transitory computer readable media of claim 13 wherein the property template is one of a discrete plurality of property templates for the aggregator, each property template defining a discrete plurality of property configurations.

21. The non-transitory computer readable media of claim 20 wherein the discrete plurality of property configurations include delivery region, cache control setting, domain protocol, origin protocol, query string setting and geo-blocking.

22. The non-transitory computer readable media of claim 21 further comprising receiving a content request for content of the customer of the aggregator of services of the content delivery network, the content request received at the VIP address bound to the pre-established property template such that the content request may be processed in accordance with the selected parameters and without the content delivery network maintaining a direct property for the customer of the aggregator.

23. The non-transitory computer readable media of claim 13 wherein the aggregator is a reseller.

24. The non-transitory computer readable media of claim 13 wherein the at least one second DNS record is established outside the authoritative name servers of the content delivery network.

25. An apparatus comprising:
at least one processing unit operable to:
receive a selection of one or more property parameters associated with a pre-established property template, the property template associated with processing a content request to a content delivery network and bound to a virtual IP (VIP) address, the selection being received from a customer of an aggregator of services of a content delivery network;
receive an origin and an alias of the origin, the origin for obtaining content of the customer of the aggregator of services of the content delivery network, the alias of the origin used by the customer of the aggregator for designating content to be served by the content delivery network; and
establish at least one first domain name system (DNS) record outside the authoritative name servers of the content delivery network, the at least one first DNS record creating an association between the alias of the origin and the origin such that a fill request from the content delivery network may be processed at the origin and at least one second DNS record, the at least one second DNS record creating an association between the alias of the origin and the VIP address bound to the property template.

26. The apparatus of claim 25 wherein the at least one first DNS record comprises a combination of the alias and a domain of the aggregator, and the at least one first DNS record is established in an authoritative name server of the aggregator.

27. The apparatus of claim 26 wherein the at least one first DNS record comprises the combination of the alias and the domain of the aggregator is only established for a valid customer of the aggregator of services of the content delivery network.

28. The apparatus of claim 27 wherein the fill request from the content delivery network may be processed at the origin without the content delivery network having direct information as to the origin.

29. The apparatus of claim 25 wherein the at least one first DNS record comprises a CNAME record.

30. The apparatus of claim 25 further comprising establishing at least one third DNS record within the authoritative name servers of the customer of the aggregator, the at least one third DNS record creating an association between the alias of the origin and the aggregator of services of the content delivery network.

31. The apparatus of claim 30 wherein a name server of the aggregator of services of the content delivery network is the authoritative name server of the customer of the aggregator.

32. The apparatus of claim 25 wherein the property template is one of a discrete plurality of property templates for the aggregator, each property template defining a discrete plurality of property configurations.

33. The apparatus of claim 32 wherein the discrete plurality of property configurations include delivery region, cache control setting, domain protocol, origin protocol, query string setting and geo-blocking.

34. The apparatus of claim 33 further comprising receiving a content request for content of the customer of the aggregator of services of the content delivery network, the content request received at the VIP address bound to the pre-established property template such that the content request may be processed in accordance with the selected parameters and without the content delivery network maintaining a direct property for the customer of the aggregator.

35. The apparatus of claim 25 wherein the aggregator is a reseller.

36. The apparatus of claim 25 wherein the at least one second DNS record is established outside the authoritative name servers of the content delivery network.

37. A method for delivering content in a content delivery network, the method comprising:
establishing a first DNS record, the first DNS record creating a first association between a customer of an aggregator of services of the content delivery network and a virtual IP (VIP) address, the virtual IP address being bound to a property template, the first association operable to verify that a requester of content from the content delivery network is an authorized requester; and
establishing a second DNS record outside the content delivery network, the second DNS record creating a second association between the customer of the aggregator of services of the content delivery network and an origin, the second association operable to allow the content delivery network to locate the origin of requested content.

\* \* \* \* \*